US009797570B2

(12) United States Patent
Lee

(10) Patent No.: US 9,797,570 B2
(45) Date of Patent: Oct. 24, 2017

(54) AIR VENT DEVICE FOR VEHICLE LAMP

(71) Applicant: HYUNDAI MOBIS Co., Ltd., Yongin-si, Gyeonggi-do (KR)

(72) Inventor: Jae ho Lee, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 383 days.

(21) Appl. No.: 14/530,877

(22) Filed: Nov. 3, 2014

(65) Prior Publication Data

US 2015/0153016 A1 Jun. 4, 2015

(30) Foreign Application Priority Data

Nov. 29, 2013 (KR) ........................ 10-2013-0146837

(51) Int. Cl.
*B60Q 1/00* (2006.01)
*F21S 8/10* (2006.01)

(52) U.S. Cl.
CPC .................................. *F21S 48/332* (2013.01)

(58) Field of Classification Search
CPC .......... F21S 48/32; F21S 48/34; F21S 48/321; F21S 48/332; F21S 48/335; G05K 5/0213; B01D 53/22
USPC ....................................... 362/547; 313/45–46
See application file for complete search history.

(56) References Cited

U.S. PATENT DOCUMENTS

| | | | | |
|---|---|---|---|---|
| 8,821,226 B2 * | 9/2014 | Yano | B65D 77/225 454/143 |
| 2008/0122993 A1 * | 5/2008 | Nakamichi | H04N 5/64 348/789 |
| 2009/0047890 A1 | 2/2009 | Yano et al. | |
| 2010/0227544 A1 * | 9/2010 | Furuyama | F21V 31/03 454/339 |
| 2012/0174789 A1 * | 7/2012 | Ono | F16K 24/04 96/4 |

FOREIGN PATENT DOCUMENTS

| | | |
|---|---|---|
| CN | 101312854 A | 11/2008 |
| CN | 101331037 A | 12/2008 |
| CN | 102472402 A | 5/2012 |

(Continued)

OTHER PUBLICATIONS

Tanihata, "Condensation preventing device for vehicular lighting fixture", May 23, 2003, Patent JP2003151342A; Google Patents, https://patents.google.com/patent/JP2003151342A/en.*

(Continued)

*Primary Examiner* — Andrew Coughlin
*Assistant Examiner* — Michael Chiang
(74) *Attorney, Agent, or Firm* — Paratus Law Group, PLLC

(57) ABSTRACT

Disclosed is an air vent device for a vehicle lamp, including: an inner housing which is installed on a lamp housing, has an opening portion formed at one side thereof, and has a moisture generation inducing zone that is formed in the inner housing and generates moisture; and an outer housing which has a low pressure inducing unit that is formed between the inner housing and the outer housing and allows the outside air to pass therethrough, and discharges the moisture generated in the moisture generation inducing zone to the outside through the opening portion and the low pressure inducing unit.

16 Claims, 6 Drawing Sheets

(56) References Cited

FOREIGN PATENT DOCUMENTS

| | | | | |
|---|---|---|---|---|
| JP | 2003-151342 | | 5/2003 | |
| JP | 2003151342 A | * | 5/2003 | ............ F21S 48/332 |
| JP | 2013-161604 A | | 8/2013 | |

OTHER PUBLICATIONS

Apr. 6, 2017, Chinese Office Action for related CN application No. 201410419610.5.

* cited by examiner

AIR VENT DEVICE FOR VEHICLE LAMP

CROSS-REFERENCE TO RELATED APPLICATIONS

The present application claims priority to Korean Patent Application Number 10-2013-0146837 filed Nov. 29, 2013, the entire contents of which the application is incorporated herein for all purposes by this reference.

TECHNICAL FIELD

The present invention relates to an air vent device for a vehicle lamp, and more particularly, to an air vent device for a head lamp of a vehicle for effectively removing moisture generated in a module of the head lamp of the vehicle.

BACKGROUND

In general, a head lamp module, which emits light in a direction in which a vehicle travels, is provided in the vehicle in order to ensure a visual field when the vehicle travels at night.

In the head lamp module, intense light is emitted from a light source unit that generates a predetermined amount of heat while being supplied with electric power, and the visual field at a front side of the vehicle is ensured using the emitted light.

However, in the head lamp module for a vehicle according to the related art, moisture is inadvertently generated due to a difference in temperature between a high internal temperature in the head lamp module, which is caused by heat generated from the light source unit, and a low external temperature, and the moisture is attached to a transparent light transmitting glass that is provided in front of the light source unit, and as a result, there are problems in that the moisture disperses the emitted light, consumer's sensitive quality deteriorates because of stains that are generated when the moisture flows, and anti-corrosive performance deteriorates due to the moisture.

Meanwhile, Japanese Patent Application Laid-Open No. 2013-161604 discloses an invention for adjusting a size of an opening portion, which communicates the inside and the outside of a lamp housing, so as to easily discharge moisture generated in a lamp housing in which a light source unit is installed, but there is a problem in that watertight performance deteriorates in the lamp housing because foreign substances flow in through the opening portion together with outside air for dehumidification.

In Japanese Patent Application Laid-Open No. 2013-161604, a filter is installed in the opening portion in order to prevent the inflow of the foreign substances, but the moisture in the lamp housing cannot be easily discharged to the outside because of the filter, and as a result, there is a problem in that a specific power source for discharging the moisture is required.

Meanwhile, in general, an inner surface of the lamp housing is coated with an expensive hydrophilic coating agent in order to form a thin water film on the inner surface of the lamp housing so as to prevent moisture from being formed on the inner surface of the lamp housing, but even in this case, there are problems in that water stains are formed because water flows when an excessive amount of moisture is generated, and costs of products are increased because the hydrophilic coating agent is expensive.

SUMMARY

The present invention has been made in an effort to provide an air vent device for a vehicle lamp, capable of reducing costs for manufacturing products, and quickly removing moisture generated in a head lamp module.

An exemplary embodiment of the present invention provides an air vent device for a vehicle lamp, including: an inner housing which is installed on a lamp housing, has an opening portion formed at one side thereof, and has a moisture generation inducing zone that is formed in the inner housing and generates moisture; and an outer housing which has a low pressure inducing unit that is formed between the inner housing and the outer housing and allows the outside air to pass therethrough, and discharges the moisture generated in the moisture generation inducing zone to the outside through the opening portion and the low pressure inducing unit.

The low pressure inducing unit may be formed at an upper side of the opening portion, and the outer housing may cover the inner housing so that a part of the inner housing is exposed to the outside.

A permeable membrane may cover the opening portion of the inner housing, and the permeable membrane may be formed as a porous membrane that allows vapor to pass therethrough.

The inner housing may be formed of a material that has higher thermal conductivity than a material of the outer housing, and for example, the inner housing may be made of aluminum, and the outer housing may be made of PE.

The outer housing may have an inlet portion into which the outside air flows, and an outlet portion from which the outside air, which has flowed into the inlet portion, is discharged, and the low pressure inducing unit may be formed between the inlet portion and the outlet portion and generate low pressure when the outside air flows.

An inflow path positioned between the inlet portion and the low pressure inducing unit may be formed so that a cross-sectional area of the inflow path becomes gradually larger toward the low pressure inducing unit. To this end, the inner housing may be formed so that a width in a left and right direction thereof becomes gradually narrower toward the opening portion.

A plurality of partition plates may be disposed in the moisture generation inducing zone of the inner housing so as to be spaced apart from each other.

A foreign substance discharge hole, which discharges foreign substances flowing into the outer housing to the outside, may be formed in the outer housing.

A first hook portion, which is coupled to the lamp housing, may be formed on the inner housing, a flange portion may be formed on a lower portion of the inner housing, and the first hook portion may be formed on a bottom surface of the flange portion, such that the first hook portion may be inserted and coupled to the lamp housing in a state in which a rubber seal is interposed between the flange portion and the lamp housing.

A second hook portion may be formed on the outer housing, and a hook accommodating portion to which the second hook portion is coupled may be formed on the inner housing.

Meanwhile, a flange portion may be formed on a lower portion of the inner housing, the hook accommodating portion may be formed on the flange portion, and the outer housing may be installed on the flange portion.

Meanwhile, the low pressure inducing unit, and an inflow path for the outside air and a discharge flow path for the outside air, which are positioned at front and rear sides of the low pressure inducing unit, may be formed in a nozzle shape.

The air vent device for a vehicle lamp according to the present invention may achieve the following effects.

The air vent device for a vehicle lamp according to the present invention is installed on the head lamp housing of the vehicle, generates moisture by condensing moisture contained in the air in the head lamp housing using a difference in temperature with the outside, and removes the generated moisture by discharging the moisture to the outside when the vehicle travels, thereby improving light emitting performance of the head lamp, and extending a lifespan of the head lamp.

Only vaporized moisture is discharged to the outside by using the permeable membrane, thereby preserving watertight performance of the lamp housing.

It is possible to remove the moisture in the head lamp housing without using an expensive hydrophilic coating agent, thereby preventing an increase in cost for manufacturing the head lamp.

DETAILED DESCRIPTION

Hereinafter, exemplary embodiments of an air vent device for a vehicle lamp according to the present invention will be described with reference to the accompanying drawings.

Figure 1:
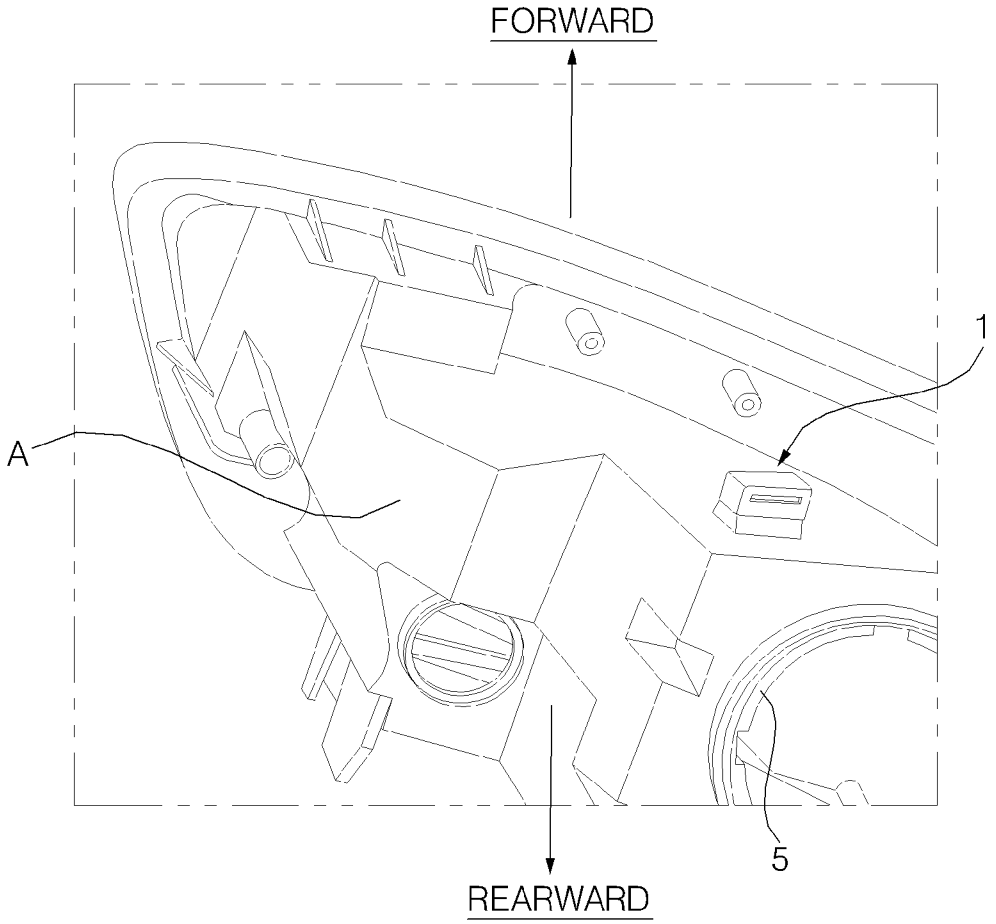
FIG. 1 is a perspective view illustrating a state in which an air vent device for a vehicle lamp according to the present invention is installed on a lamp housing.

As illustrated in FIG. 1, an air vent device 1 for a vehicle lamp according to the present invention is installed on one side surface of a lamp housing A in which a light source installation unit 5 to which a light source unit (not illustrated) is installed is formed.

Figure 2:
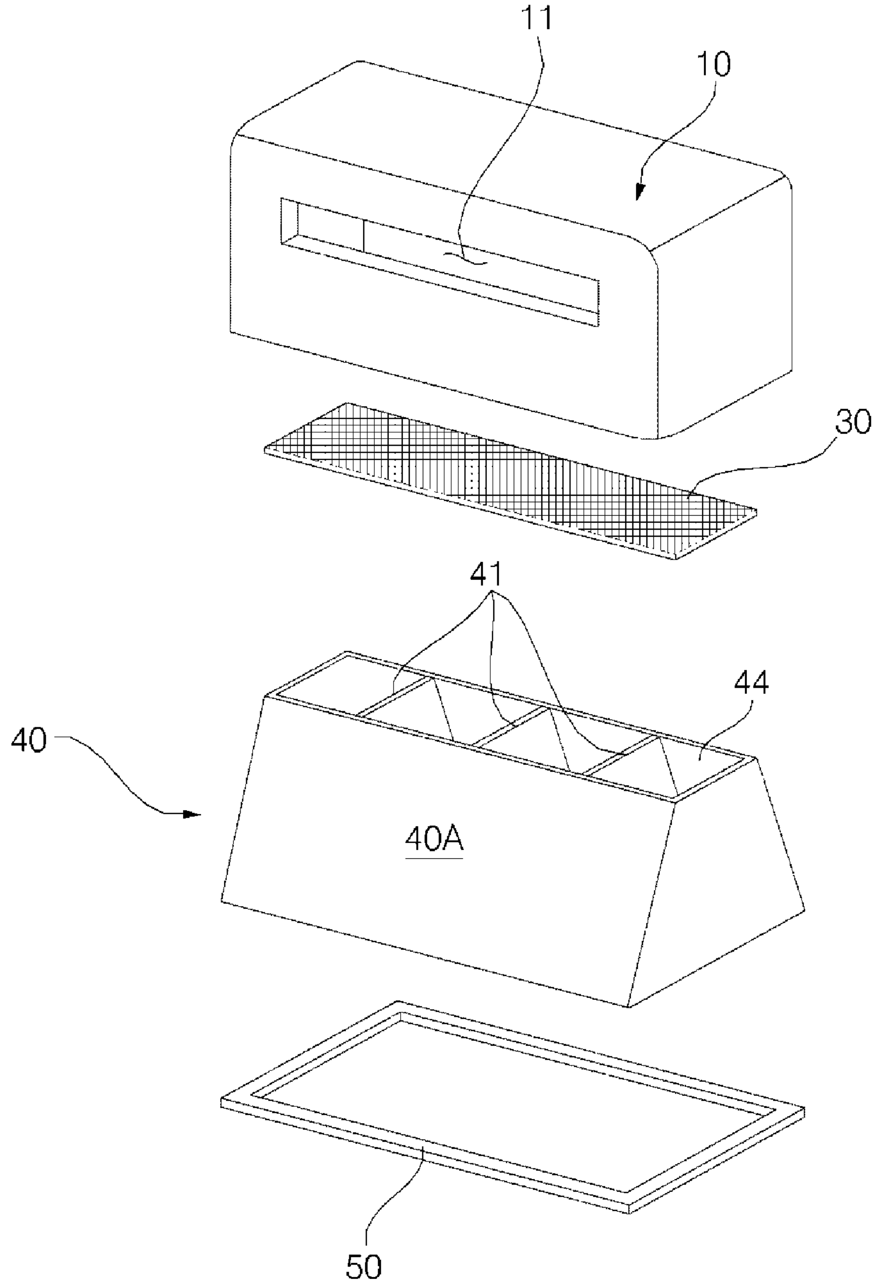
FIG. 2 is an exploded perspective view illustrating a first exemplary embodiment in which the air vent device for a vehicle lamp according to the present invention is implemented.
Figure 3:
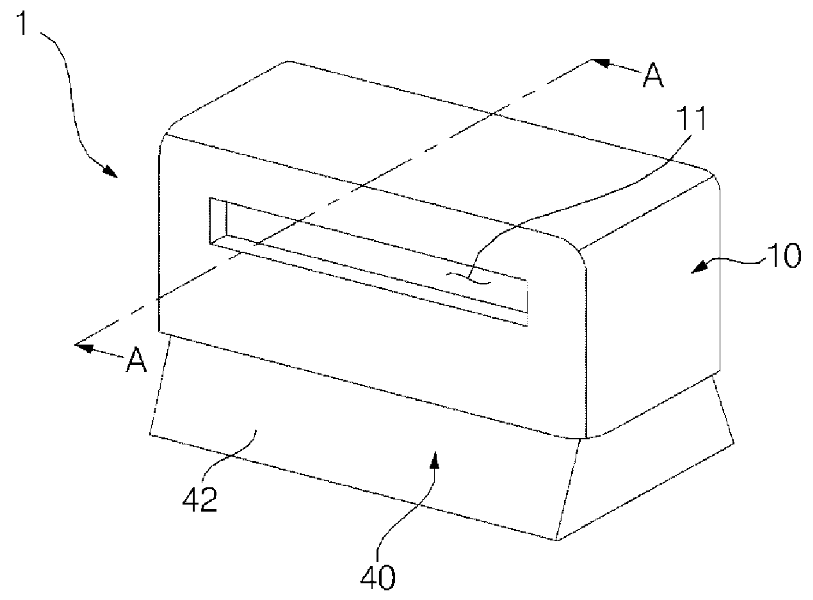
FIG. 3 is a perspective view of the first exemplary embodiment of the present invention illustrated in FIG. 2.
Figure 4:
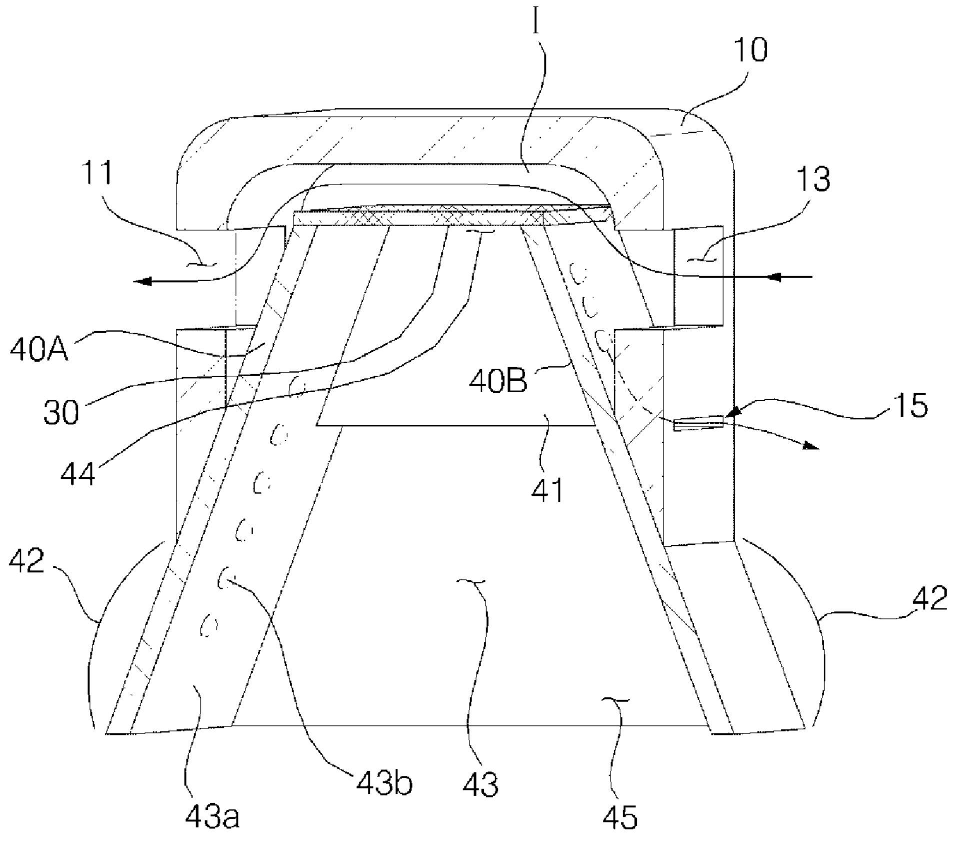
FIG. 4 is a cross-sectional view taken along line A-A of FIG. 3.

FIG. 2 is an exploded perspective view illustrating a first exemplary embodiment of the air vent device 1 for a vehicle lamp according to the present invention, FIG. 3 is a perspective view, and FIG. 4 is a cross-sectional view taken along line A-A of FIG. 3.

As illustrated in FIGS. 1 to 4, the first exemplary embodiment of the present invention includes: an inner housing 40 which is installed on the lamp housing A to which the light source unit (not illustrated) is installed, has a moisture generation inducing zone 43 in which moisture is generated, and has an opening portion 44 formed at one side thereof; and an outer housing 10 which has a low pressure inducing unit I which is formed between the inner housing 40 and the outer housing 10 and allows outside air to pass therethrough, and discharges the moisture generated in the moisture generation inducing zone to the outside through the opening portion 44 and the low pressure inducing unit I.

The outer housing 10 may be formed of a nonmetallic material such as polyethylene (PE) or epoxy, and has an inlet portion 13 through which the outside air flows into the low pressure inducing unit I, and an outlet portion 11 through which the outside air is discharged to the outside after passing through the low pressure inducing unit I.

The inlet portion 13 and the outlet portion 11 may be formed to be disposed at positions that are most suitable to allow the outside air to flow into the inlet portion 13 when a vehicle travels forward, and allow the outside air to be discharged through the outlet portion 11 after passing through the low pressure inducing unit I.

The inlet portion 13 and the outlet portion 11 may be formed at sides, which are opposite to each other, so as to be elongated to one side, respectively, so that a maximum amount of outside air may pass therethrough.

Meanwhile, the inner housing 40 includes a wall surface, which surrounds an internal area in all directions so as to allow a bottom portion 45 to be opened, and form a space portion 43 that communicates with the inside of the lamp housing A, and the space portion 43 forms a zone for inducing the moisture to be generated.

In the above description, the space portion, which corresponds to the moisture generation inducing zone 43, is defined as the zone for artificially inducing the moisture to be generated for explanatory purpose, but actually means a location where the moisture is induced to be generated while moisture in inside air is condensed due to a difference in temperature between an outer surface of the wall surface which is exposed to the outside air and the space portion 43 inside the wall surface which communicates with the light source unit. Therefore, any location may be the moisture generation inducing zone 43 as long as the location is disposed in the inner housing 40, and since an inner surface 43*a* of the wall surface is a portion where the difference in temperature is greatest in the inner housing 40, a moisture layer may be formed on the inner surface 43*a* of the wall surface, or fine particles of moisture 43*b* may be formed on the inner surface 43*a* of the wall surface.

Meanwhile, the outer housing 10 covers an upper portion of the inner housing 40 so that a lower portion 42 of the wall surface of the inner housing 40 is exposed to the outside, such that the generation of the moisture in the inner housing 40 may be promoted by the lower portion 42. In addition, the inner housing 40 may be formed of a material that has higher thermal conductivity than a material of the outer housing 10. For example, in a case in which the outer housing 10 is formed of a nonmetallic material as described above, the inner housing 40 may be manufactured using a metallic material having high thermal conductivity, because the metallic material typically has higher thermal conductivity than the nonmetallic material.

In a case in which the inner housing 40 is formed of the metallic material as described above, low temperature at the outside is transferred to the inside through the metallic material having high thermal conductivity due to the difference in temperature between a relatively low external temperature and a high internal temperature, such that the moisture may be more quickly condensed in the inner housing 40, and may be collected.

The moisture, which is generated as described above, is vaporized by heat that is generated when the light source unit is operated, and the vaporized moisture is discharged to the low pressure inducing unit I.

The inner housing 40 may be formed by die casting using an aluminum material having high thermal conductivity.

Meanwhile, the inner housing 40 communicates with the low pressure inducing unit I of the outer housing 10 through the opening portion 44, and the opening portion 44 of the inner housing 10 is covered by a permeable membrane 30.

Therefore, the inner housing 40 and the outer housing 10 are partitioned by the permeable membrane 30, thereby ensuring a flow of gas that may resolve the imbalance in internal pressure between the moisture generation inducing zone 43 and the low pressure inducing unit I.

The permeable membrane 30 may be formed as a porous membrane that does not allow a liquid material and a solid material to pass therethrough, but allows gaseous vapor containing moisture to pass therethrough.

Meanwhile, gas flows at least at a higher velocity in the outer housing 10 than in the inner housing 40 although the velocity is varied depending on a driving state of the vehicle. That is, the outside air flows in through the inlet portion 13 of the outer housing 10, and thereafter, the outside air flows in the low pressure inducing unit I at a high velocity while being discharged through the outlet portion 11, such that gas in the inner housing 40 is sucked into the low pressure inducing unit I and then discharged.

As illustrated in FIG. 4, the low pressure inducing unit I is formed between the inlet portion 13 into which the outside air flows and the outlet portion 11 from which the outside air, which has flowed into the inlet portion 13, is discharged to the outside, and induces low pressure while allowing the outside air, which has flowed in through the inlet portion 13, to flow at a high velocity.

The inlet portion 13 may be formed to have a flow cross-sectional area that becomes gradually narrower so that the velocity of the outside air is increased.

As illustrated in FIG. 4, in the inner housing 40, a width in a left and right direction between one wall surface 40A and the other wall surface 40B becomes gradually narrower toward the low pressure inducing unit I, so that a cross-sectional area of a supply flow path between the inlet portion 13 and the low pressure inducing unit I, and a cross-sectional area of a discharge flow path between the low pressure inducing unit I and the outlet portion 11 become gradually larger. The purpose of this configuration is to accelerate the flow of the moisture from the inside of the inner housing 40 to the low pressure inducing unit I, by allowing the supply flow path, the low pressure inducing unit I, and the discharge flow path to have a nozzle shape in order to promote the generation of low pressure by accelerating the flow of outside air in the low pressure inducing unit I. Therefore, in the inner housing 40, the wall surfaces 40A and 40B, which face each other, may be formed to be inclined so that the width in the left and right direction thereof becomes gradually narrower toward the opening portion 44, and wall surfaces of the outer housing 10, which face each other, may be vertically formed to have a constant width in the left and right direction.

A plurality of partition plates 41, which divides the moisture generation inducing zone 43 into a plurality of zones, may be formed in the inner housing 40 in a vertical direction so as to be spaced apart from each other. The partition plates 41 may be formed integrally with the inner housing 40 when the inner housing 40 is formed by die casting.

The partition plates 41 divide the moisture generation inducing zone 43 into the plurality of zones, such that gas flows from the moisture generation inducing zone 43 to the low pressure inducing unit I even by a tiny amount of flow of outside air in the low pressure inducing unit I, and the generation of moisture in the moisture generation inducing zone 43 is promoted.

The outer housing 10 is coupled to the inner housing 40 using a binding material or a welding material so as to surround at least a part of the inner housing 40, and the outer housing 10 may be coupled to the inner housing 40 so that the lower portion 42 of the inner housing 40 is exposed to the outside.

Meanwhile, in order to discharge foreign substances to the outside in a case in which the foreign substances flow in through the inlet portion 13 together with the outside air, a foreign substance discharge hole 15, which communicates with the outside, may be formed in the outer housing 10.

Non-described reference numeral 50 indicates a rubber seal for sealing between the lamp housing A and the inner housing 40. The rubber seal 50 is inserted into an inner side of a lower end portion of the inner housing 40, and thereafter, the bottom portion of the inner housing 40 may be attached to a surface of the lamp housing A using an adhesive or a welding means.

An operational process of the air vent device for a vehicle lamp according to the present invention, which is configured as described above, will be described below.

First, in the inner housing 40, moisture contained in inside air is condensed in the moisture generation inducing zone 43, which corresponds to the internal space portion, and a predetermined amount of moisture is generated, by the difference in temperature between a low external temperature and a high internal temperature The moisture is vaporized by heat that is generated when the light source unit installed in the lamp housing A is operated, and the vaporized moisture is sucked into the low pressure inducing unit I through which the outside air, which flows in through the inlet portion 13 of the outer housing 10 when the vehicle travels, flows at a high velocity, and the vaporized moisture is discharged to the outside through the outlet portion 11 together with the outside air that flows in the low pressure inducing unit I.

As described above, the air vent device for a vehicle lamp according to the present invention actively condenses the moisture inside the lamp housing in the moisture generation inducing zone 43, and then discharges the moisture to the outside when the vehicle travels, thereby improving light emitting performance of the head lamp, and extending a lifespan of the vehicle lamp module.

A light transmitting glass was coated with an expensive hydrophilic coating agent in the related art in order to prevent moisture from being generated on the light transmitting glass, but by the air vent device according to the present invention, it is possible to immediately remove the moisture without using the expensive hydrophilic coating agent, thereby preventing costs for manufacturing products from being increased.

Figure 5:
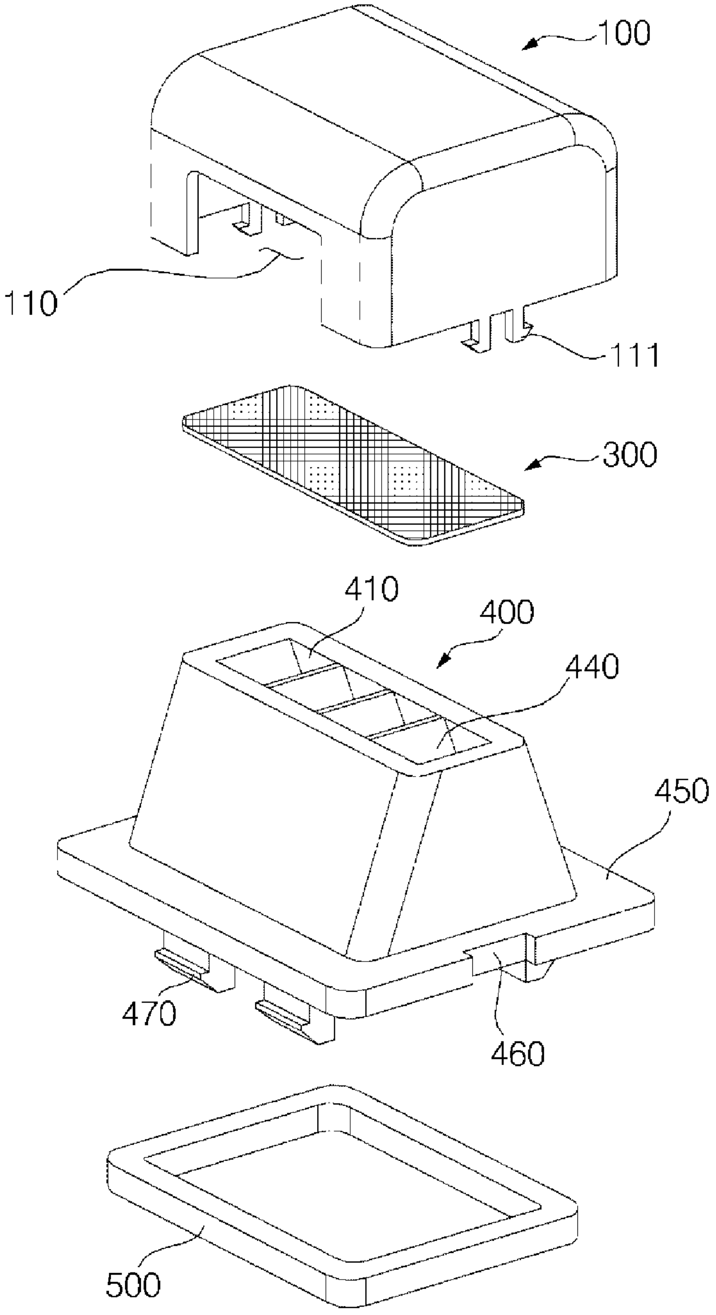
FIG. 5 is an exploded perspective view illustrating a second exemplary embodiment in which the air vent device for a vehicle lamp according to the present invention is implemented.
Figure 6:
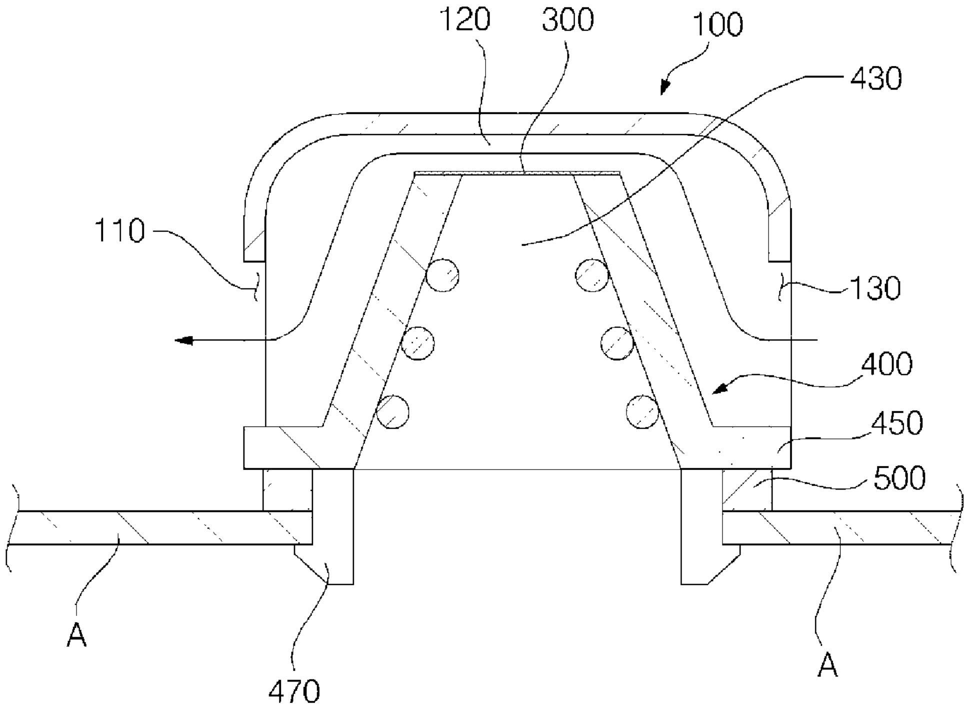
FIG. 6 is a cross-sectional view of the second exemplary embodiment of the present invention illustrated in FIG. 5.

FIGS. 5 and 6 are views illustrating a configuration in which a second exemplary embodiment of the present invention is implemented, and the second exemplary embodiment of the present invention will be described below with reference to FIGS. 5 and 6.

The second exemplary embodiment of the present invention includes: an inner housing 400 which has an opening portion 440 formed at an upper side thereof, and has a space portion 430 in which moisture is induced to be generated; and an outer housing 100 which forms a low pressure inducing unit 120 between the inner housing 400 and the outer housing 100. The space portion 430 is partitioned by partition plates 410.

Meanwhile, a permeable membrane 300 covers the opening portion 440, and a rubber seal 500 is interposed between a bottom portion of the inner housing 400 and a lamp housing A to which the inner housing 400 is attached.

An inlet portion 130 into which the outside air flows, and an outlet portion 110 from which the outside air, which has flowed into the inlet portion 130, is discharged are formed in the outer housing 100.

Because there is no difference in terms of operational effect between the outer housing 100, the inner housing 400, and the permeable membrane 300 according to the second exemplary embodiment of the present invention, and the outer housing 10, the inner housing 40, and the permeable membrane 30 according to the first exemplary embodiment of the present invention, descriptions of the moisture inducing zone 430 and the low pressure inducing unit 120 will be omitted.

Meanwhile, in the inner housing 400 according to the second exemplary embodiment of the present invention, a flange portion 450 is formed on a lower end portion of the inner housing 400, and a first hook portion 470 is formed on a bottom surface of the flange portion 450, such that the inner housing 400 is coupled to the lamp housing A by the first hook portion 470 in a state in which the rubber seal 500 is interposed.

Meanwhile, a second hook portion 111 is formed on a bottom portion of the outer housing 100, and a hook accommodating portion 460 is formed on the flange portion 450 of the inner housing 400, such that the second hook portion 111 is coupled to the hook accommodating portion 460, and the outer housing 100 is installed on the flange portion 450 of the inner housing 400.

As described above, the preferred exemplary embodiments of the head lamp module for a vehicle according to the present invention have been described in detail with reference to the accompanying drawings. However, the exemplary embodiments of the present invention are not necessarily limited by the aforementioned preferred exemplary embodiment, and it would be appreciated that various modifications and equivalent exemplary embodiments may be made by those skilled in the art. Accordingly, it should be understood that the true scope of the present invention shall be defined by the claims to be disclosed below.

What is claimed is:

1. An air vent device for a vehicle lamp, comprising:

an inner housing installed on an outer surface of a lamp housing and located outside the lamp housing, the inner housing including:

an inside of the inner housing communicating with an inside of the lamp housing, an opening portion formed at one side of the inner housing, and a moisture generation inducing zone formed at the inside of the inner housing and located outside the lamp housing; and an outer housing covering an upper portion of the inner housing and forming a low pressure inducing zone between the inner housing and the outer housing, the low pressure inducing zone being configured to allow outside air to pass therethrough and discharge moisture generated in the moisture generation inducing zone to an outside of the air vent device, wherein the moisture generation inducing zone of the inner housing is formed of a metallic material that has higher thermal conductivity than a thermal conductivity of the outer housing to increase heat transfer between the outside of the air vent device and the moisture generation inducing zone.

2. The air vent device of claim 1, wherein the low pressure inducing zone is formed at an upper side of the opening portion.

3. The air vent device of claim 1, wherein a part of the inner housing is exposed to the outside of the air vent device.

4. The air vent device of claim 1, further comprising a permeable membrane which covers the opening portion of the inner housing.

5. The air vent device of claim 4, wherein the permeable membrane is formed as a porous membrane that allows vapor to pass therethrough.

6. The air vent device of claim 1, wherein the inner housing is made of aluminum, and the outer housing is made of polyethylene (PE).

7. The air vent device of claim 1, wherein the outer housing has an inlet portion into which the outside air flows, and an outlet portion from which the outside air, which has flowed into the inlet portion, is discharged, and the low pressure inducing zone is formed between the inlet portion and the outlet portion and generates low pressure between the inner housing and the outer housing.

8. The air vent device of claim 7, wherein the low pressure inducing zone, and an inflow path and a discharge flow path for the outside air, which are connected to the low pressure inducing zone so as to face each other, are formed in a nozzle shape.

9. The air vent device of claim 7, wherein an inflow path positioned between the inlet portion and the low pressure inducing zone is formed such that a cross-sectional area of the inflow path becomes gradually larger toward the low pressure inducing zone.

10. The air vent device of claim 9, wherein the inner housing is formed such that a width in a left and right direction between wall surfaces, which face each other, becomes gradually narrower toward the opening portion.

11. The air vent device of claim 1, wherein the inner housing further includes a partition plate is disposed in the moisture generation inducing zone.

12. The air vent device of claim 1, wherein the outer housing further includes a foreign substance discharge hole which discharges foreign substances flowing into the outer housing to the outside of the air vent device.

13. The air vent device of claim 1, wherein the inner housing further includes a first hook portion which is coupled to the lamp housing.

14. The air vent device of claim 13, wherein the inner housing further includes:

a flange portion formed on a lower portion of the inner housing, and a rubber seal interposed between the flange portion and the lamp housing, and wherein the first hook portion is formed on a bottom surface of the flange portion.

15. The air vent device of claim 1, wherein the outer housing further includes a second hook portion, and the inner housing further includes a hook accommodating portion to which the second hook portion is coupled.

16. The air vent device of claim 15, wherein the inner housing further includes a flange portion formed on a lower portion of the inner housing, and wherein the hook accommodating portion is formed on the flange portion, and the outer housing is installed on the flange portion.

* * * * *